June 22, 1937.

C. A. CULVER

Re. 20,416

ELECTRICAL GENERATOR

Original Filed Aug. 19, 1931 2 Sheets-Sheet 1

INVENTOR
Charles A. Culver
BY
Wm. J. Herdman
ATTORNEY

June 22, 1937. C. A. CULVER Re. 20,416

ELECTRICAL GENERATOR

Original Filed Aug. 19, 1931 2 Sheets-Sheet 2

INVENTOR
Charles A. Culver
BY
Wm. J. Herdman
ATTORNEY

Reissued June 22, 1937 Re. 20,416

UNITED STATES PATENT OFFICE 20,416

ELECTRICAL GENERATOR

Charles A. Culver, Northfield, Minn.

Original No. 1,893,019, dated January 3, 1933, Serial No. 558,004, August 19, 1931. Application for reissue April 7, 1937, Serial No. 135,589

12 Claims. (Cl. 175—363)

My invention pertains in general to electrical generators and specifically relates to electrical generators for producing electromotive forces of predetermined wave shapes.

One of the objects of my invention comprises providing an electrical generator for producing alternating electromotive forces by electrostatic means.

Another object consists in producing means for generating alternating electromotive forces having wave forms predetermined by the configuration of electrodes.

I accomplish these and other desirable objects in a novel electrical generator employing a plurality of condenser plates of predetermined configuration adapted to be relatively moved for producing alternating electromotive forces of predetermined wave form.

In the drawings which accompany and form a part of this specification and in which like reference numerals designate corresponding parts throughout:

My invention is directed to providing means for electrostatically producing alternating electromotive forces of predetermined wave form. According to my invention, I provide a system of condenser plates adapted to be relatively moved at comparatively high speeds to produce variable charges for controlling space discharge amplifier tubes. In carrying out my invention, I employ a pair of insulating drums adapted to be rotated in juxtaposition to one another. These drums are provided with condenser plates of definite configuration whereby the movement of the plates on one drum relative to a condenser plate on the other of the drums produces capacitance variations.

Figure 1:
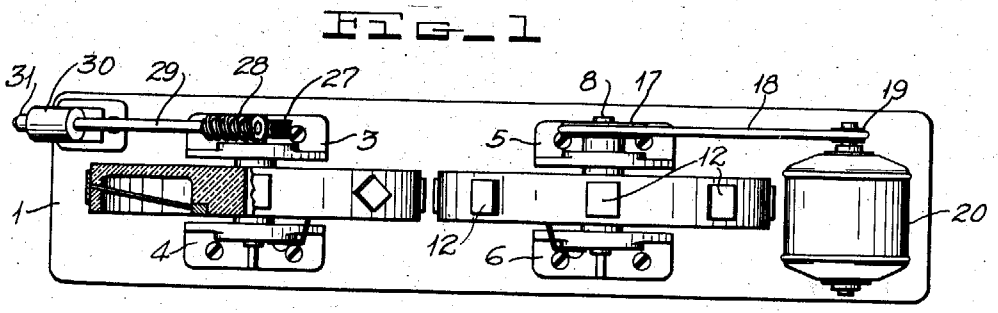
Fig. 1 is a top plan view of one embodiment of the mechanical construction of the electrical generator of my invention.
Figure 2:
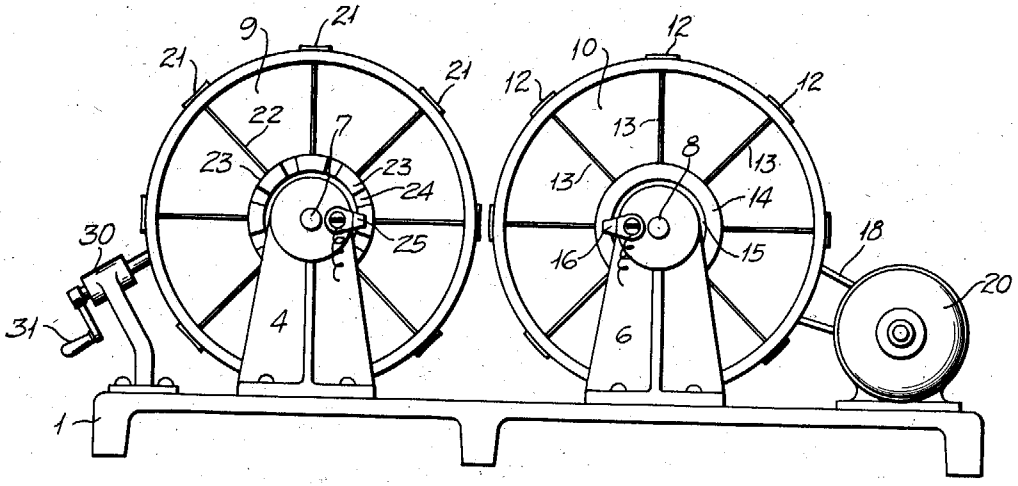
Fig. 2 is a side elevation of the apparatus depicted in Fig. 1.

Referring to the drawings in detail, and particularly to Figs. 1 and 2, I provide a base member 1 having up-right supporting members 3, 4, 5 and 6 secured thereto. A shaft 7 is journaled between the supporting members 3 and 4, while another shaft 8 is journaled between the supporting members 5 and 6. A drum 9 is carried by the shaft 7, while another drum 10 is carried by the shaft 8. The drums 9 and 10 are composed of insulating material, such as a phenol condensation product.

A plurality of condenser plates 12 are mounted upon the periphery of the drum 10. In the present embodiment of my invention, the condenser plates 12 are rectangularly shaped, although other configurations may be employed as will be hereinafter apparent. Each of the condenser plates 12 is provided with an electrical connection 13 extending to a metallic collector ring 14 mounted on the hub 15 of the drum 10. The connections 13 may comprise wires soldered to the condenser plates 10 and to the metallic ring 14. A brush 16 is mounted upon the supporting member 6 in electrical engagement with the collector ring 14. The brush 16 provides means for establishing an electrical connection with the condenser plates 12 while the drum 10 is being rotated. A pulley wheel 17 is secured upon the shaft 8 for imparting rotary motion thereto from a belt 18 driven by a pulley 19 mounted upon the armature shaft of a constant speed motor 20.

A plurality of differently shaped condenser plates 21 are positioned upon the periphery of the drum 9. Each of the condenser plates 21 of the drum 9 is designed to produce an alternating electromotive force of especial wave form in accordance with my invention. The condenser plates 21 are provided with individual electrical connections 22 to metallic contacting segments 23 mounted in the insulating hub 24 of the drum 9. A contacting brush 25 is mounted on the supporting member 4 in a position such as to be in electrical engagement with the contacting segment 25 corresponding to the condenser plate 21 which is in a position approximately tangent to the drum 10. A worm wheel 27 is rigidly mounted upon the shaft 7 in engagement with a worm gear 28 which is mounted on a shaft 29. The shaft 29 is journaled in a bearing member 30 mounted upon the base 1. A hand crank 31 is secured to the shaft 29 whereby the worm wheel 27 can be manually rotated through the worm gear 28 for causing rotation of the drum 9 whereby any desired one of the condenser plates 21 can be positioned approximately tangent to the drum 10.

Figure 3:
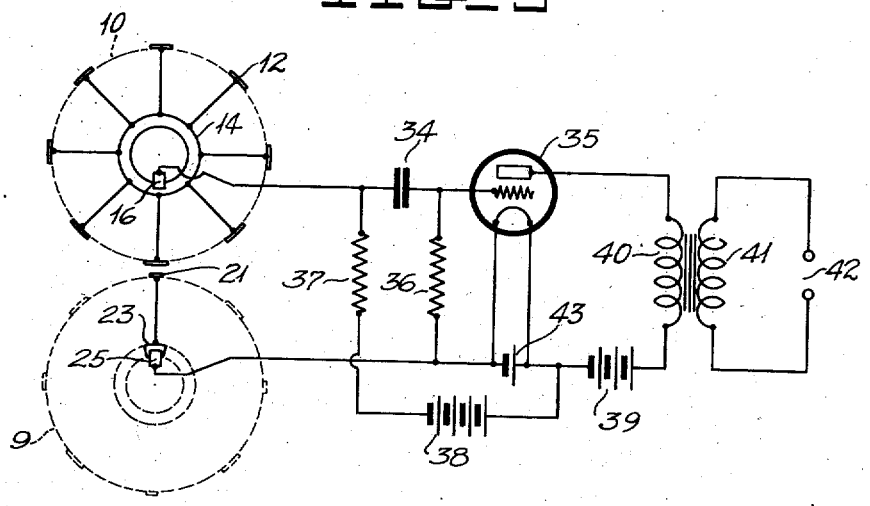
Fig. 3 is a diagrammatic representation of the electrical circuits employed in the system of my invention.

Consideration will now be given to the electrical circuits employed in the present embodiment of my invention. Referring to Fig. 3, the condenser plates 12 are connected through the collector ring 14 and brush 16 and through a condenser 34 to the control electrode of a space discharge tube 35. The condenser plate 21, which is in a position approximately tangent to the drum 10, is connected through the associated contacting segment 23 and brush 25 to the cathode of the space discharge tube 35. A resistance 36 of suitable value is provided between the control electrode and cathode of the space discharge tube 35. Another resistance 37 is connected between the input side of the condenser 34 and a source of voltage 38 which provides a polarizing potential for the condenser plates 12. The output, or anode to cathode circuit of the space discharge tube 35 includes a source of anode voltage 39 and an inductance 40 comprising the primary of a transformer including the secondary inductance 41. The inductance 41 is connected to output terminals 42. These output terminals 42 can be connected to an amplifier or any work circuit for the utilization of oscillations produced according to my system. A source of current 43 is provided for heating the filament of the space discharge tube 35 to an electron emissive temperature.

In the operation of my electrical generator to produce alternating electromotive forces of a given wave form, the drum 9 is manually rotated into a position such that a condenser plate 21 of the desired configuration is positioned approximately tangent to the drum 10. This selected condenser plate will then be in circuit with the space discharge tube 35 through brush 25. The motor 20 is then started whereby the disk 10 is rapidly rotated and the condenser plates 12 are rapidly moved past the selected condenser plate 21, the selected condenser plate 21 remaining stationary. As the condenser plates 12 are moved in sequence relatively to the selected condenser plate 21, it will be evident that the capacitance between the selected condenser plates will vary, the capacitance increasing as a condenser plate 12 approaches the selected condenser plate 21 and decreasing as it recedes. It follows that this capacitance variation will cause a varying charging current to pass through the resistance 37 to produce a varying potential on the control electrode of the space discharge tube 35 whereby a pulsating current is produced in the anode to cathode circuit of the space discharge tube 35. Alternating electromotive forces will then be induced in the secondary inductance 41 which will be of a wave form determined by the configuration of the electrodes 12 and 21. It will also be evident that the frequency of the alternating electromotive forces will be under control of the speed of rotation of the motor 20 which can be varied as required.

Figure 4:
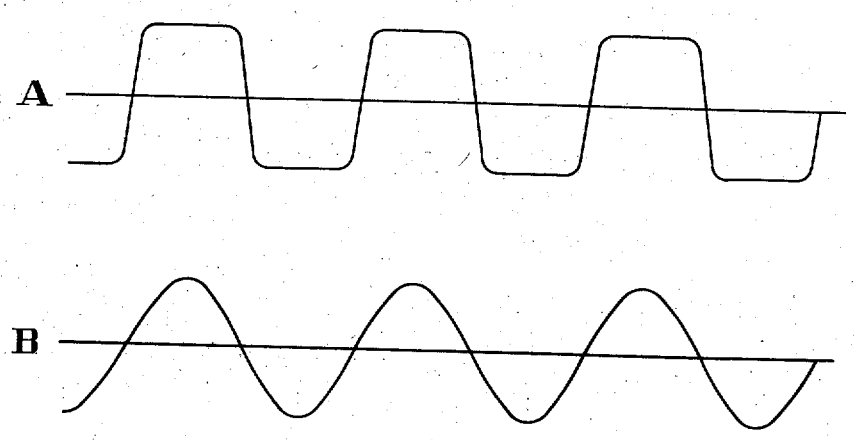
Fig. 4 is a graphical representation of typical wave forms of alternating electromotive forces which can be generated according to my system.

In one form of my invention, the condenser plates or electrodes on the periphery of the drum 10 are rectangular in shape, while the condenser plates on drum 9 are of various configurations. For instance, one of the electrodes is diamond shape, another is round, and still another is square. In experiments I have found that by utilizing a rectangular shaped electrode on the drum 9 in co-operation with square electrodes on the drum 10 I have been able to produce alternating electromotive forces having a square top wave form such as depicted by the curve A of Fig. 4. In another form of my invention I substitute round electrodes on both stationary and moving drums and have thereby produced alternating electromotive forces of sine wave formation as shown by curve B in Fig. 4.

It will now be apparent that I have produced a novel system for producing alternating electromotive forces of predetermined wave form. One of the advantages of my system resides in that a plurality of different types of wave forms can be predetermined by arrangement of stationary electrodes which can be manually moved into operative position by a convenient hand crank. The exact configuration of any of the electrodes employed in my system can be determined emperically or by computation. Although I have shown a preferred embodiment of my invention I do not desire to be limited thereto except insofar as may be pointed out in the appended claims.

What I claim as new and original and desire to secure by Letters Patent of the United States is:

1. The method of producing a variable current in the output circuit of a space discharge tube having an input circuit and output circuit including a source of current which comprises, producing condenser electrodes of such configuration as to produce a predetermined wave shape, connecting said condenser electrodes in said input circuit, and relatively moving said condenser electrodes to produce a variable current of predetermined wave form in said output circuit.

2. An electrical generator comprising, a space discharge tube having an input circuit and an output circuit including a source of current, a stationary electrode, a rotatable device having a plurality of electrodes thereon for producing variable capacitance effects in co-operation with said stationary electrode, said electrodes being connected in the input circuit of said space discharge tube whereby said variable capacitance effects produced by relative movement of said rotatable device and said stationary electrode will cause a variable current of predetermined wave form in said output circuit.

3. An electrical generator comprising, a space discharge tube having an input circuit and an output circuit including a source of current, groups of electrodes connected in said input circuit, and means for relatively moving one of said groups of electrodes with respect to a selected one of the electrodes of another of said groups of electrodes for producing a variable capacitance relation between said electrodes to produce a variable current in said output circuit, said electrodes being of a configuration to predetermine the wave form of said variable current.

4. In a system for producing variable currents of predetermined wave form, a space discharge tube having an input and output circuit including a source of current, a drum having a plurality of condenser electrodes mounted thereon and connected in said input circuit, a motor for rotating said drum, another drum having a plurality of electrodes thereon and connected in said input circuit, and means for selectively rendering said last mentioned electrodes electrically effective in said input circuit for co-operation with said first mentioned electrodes.

5. An apparatus for producing a variable current in the output circuit of a space discharge tube having an input circuit and an output circuit including a source of current, comprising condenser electrodes of relative shapes to produce a variable current of predetermined wave form, means connecting said condenser electrodes in said input circuit, and means for relatively moving said condenser electrodes to produce a variable current of predetermined wave form in said output circuit.

6. Mechanism for producing a variable current in the output circuit of a space discharge tube having an input circuit and an output circuit, comprising a variable condenser connected in said input circuit to cause actuation of said space discharge tube in accordance with capacitance variations of said condenser, said condenser including a plurality of scanning electrodes and a stationary electrode, the latter disposed so as to be scanned by said scanning electrodes, the relative shapes and forms of the scanning and stationary electrodes being such that the current impressed upon the output circuit during actuation of the space discharge tube will be of predetermined wave form; and means for driving said driven electrodes to control the frequency of the current impressed upon said output circuit.

7. A device for producing a variable current in the output circuit of a space discharge tube having an input circuit and an output circuit including a source of current, comprising a condenser adapted to be charged from said current source and embodying a stationary electrode and a series of spaced apart movably supported electrodes disposed and adapted to scan said stationary electrode, the stationary electrode and said scanning electrodes being connected in said input circuit, and means for moving said scanning electrodes with relation to said stationary electrode to actuate said space discharge tube and produce a variable current in said output circuit.

8. A device for originating a substantially sinusoidal wave form comprising a condenser embodying relatively movable capacitance elements, and rotary actuating means for varying the capacitance of said condenser by relative motion at a substantially uniform rate between the capacitance elements thereof, the design of said elements being such that the capacitance of said condenser varies substantially in accordance with the sinusoidal wave form, and means for driving said actuating means at constant speed.

9. A device for producing a variable current in the output circuit of a space discharge tube having an input circuit and an output circuit including a source of current, comprising a polarizing source, a condenser electrically connected in said input circuit and adapted to be charged from said polarizing source, said condenser including relatively movable electrodes so formed and disposed relative to each other as to vary the capacitance of said condenser in accordance with a predetermined wave form during relative motion of said electrodes, and means for moving said electrodes relatively to vary the capacitance of said condenser and produce in said output circuit a variable current of predetermined wave form.

10. Mechanism of the class described comprising a varying capacitative device including relatively movable electrodes in scanning relation to each other and of relative shapes to cause variation of capacitance therebetween in accordance with a predetermined waveform; means for continuously moving the electrodes relatively at constant speed; an electrical network system including a space discharge tube having input and output circuits, a coupling condenser having an output side connected with the control electrode of said tube and an input side connected in circuit with said varying capacitative device, a circuit including a source of voltage for polarizing said varying capacitative device, a resistance between said source and the input side of said condenser, and a resistance between the control electrode and the cathode of said tube, and a coupling device in said output circuit for connecting said capacitative device in a work circuit for delivery thereto from the output circuit of alternating voltage of said predetermined waveform.

11. An apparatus for producing a variable current in the optput circuit of a space discharge tube having an input circuit and an output circuit including a source of current, comprising a generator embodying relatively movable condenser electrodes of relative shapes such as to originate a variable current of predetermined waveform, means connecting said condenser electrodes in said input circuit, means for relatively moving said condenser electrodes, and current controlling means coacting with the generator and tube for impressing upon the output circuit a variable current of the predetermined waveform originated by the generator.

12. An apparatus for producing alternating current of prescribed waveform and for inducing in an output circuit of an electron tube amplifier alternating current of a corresponding waveform, comprising an electron tube amplifier having an input circuit and an output circuit; an alternating current generating assembly including an energizing source therefor and coacting relatively movable electrodes having wave generating surfaces of different relative shapes adapted for selective use to generate any of a plurality of different waveforms; and means whereby alternating current of the preselected waveform produced by the selected electrodes is impressed upon said input circuit for actuation of said amplifier and for inducing in said output circuit alternating curent of corresponding waveform.

CHARLES A. CULVER.